United States Patent [19]

Laidman

[11] E Patent Number: Re. 32,899

[45] Reissued Date of Patent: Apr. 4, 1989

[54] LOW VOLTAGE LIGHTING SYSTEM REPLACEABLE BULB ASSEMBLY

[76] Inventor: Jerry H. Laidman, 4658 Lacotta Pl., Sherman Oaks, Calif. 91403

[21] Appl. No.: 202,698

[22] Filed: Jun. 3, 1988

Related U.S. Patent Documents

Reissue of:

[64] Patent No.: 4,654,765
Issued: Mar. 31, 1987
Appl. No.: 779,138
Filed: Sep. 23, 1985

[51] Int. Cl.[4] ..... H01R 33/00; F21V 1/00

[52] U.S. Cl. ..... 362/226; 362/238; 362/240; 362/248; 439/57

[58] Field of Search ..... 362/226, 240, 248, 249, 362/806, 311, 307, 238, 300, 241, 219, 223, 296; 439/23, 57

[56] References Cited

U.S. PATENT DOCUMENTS

| | | | |
|---|---|---|---|
| 3,527,933 | 9/1970 | Thümmel | 362/226 X |
| 3,539,801 | 11/1970 | Bobrick | 362/240 X |
| 4,092,562 | 5/1978 | Campbell | 439/57 |
| 4,158,221 | 6/1979 | Agabekov | 362/219 |
| 4,178,627 | 12/1979 | Bauman | 362/240 |
| 4,204,273 | 5/1980 | Goldberg | 362/226 X |
| 4,363,082 | 12/1982 | Rokund | 362/223 |
| 4,482,944 | 11/1984 | Roossine et al. | 362/806 |
| 4,490,777 | 12/1984 | Tanner et al. | 362/223 |

*Primary Examiner*—Ira S. Lazarus
*Assistant Examiner*—Peggy Neils
*Attorney, Agent, or Firm*—Blakely, Sokoloff, Taylor, Zafman

[57] ABSTRACT

The assembly includes a number of readily replaceable low voltage light bulbs; for example, of the <5 watt 24 VAC type, spaced along a pair of electrical conductors carried by an insulated strip located in a housing with a removable transparent cover. The bulbs are releasably connected to the conductors in parallel by suitable electrical contacts, with or without supporting bulb brackets so that the conductors, strip and housing can be transversely severed between adjacent bulbs to shorten the assembly. Conversely, a number of assemblies can be connected in tandem to form an elongated lighting system. The cover may have edges which clip into recesses performed in the housing for ease in closing and opening the assembly. The housing may be aluminum and the cover may be polycarbonate plastic. The assembly is simple, inexpensive, adaptable to a variety of decorative uses and is durable.

9 Claims, 3 Drawing Sheets

FIG-1
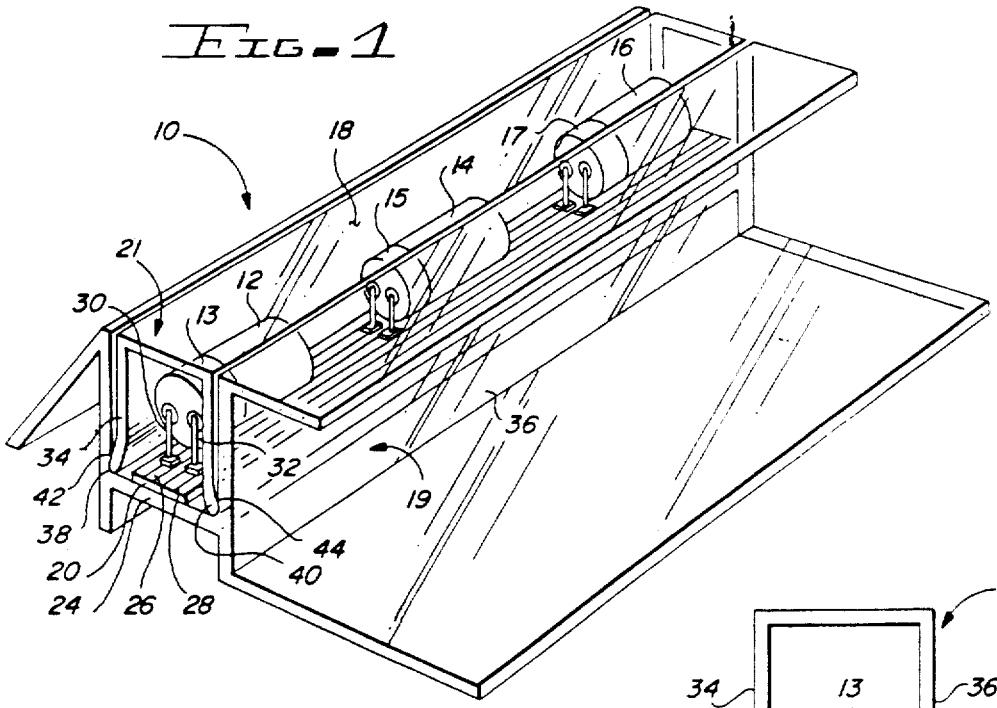
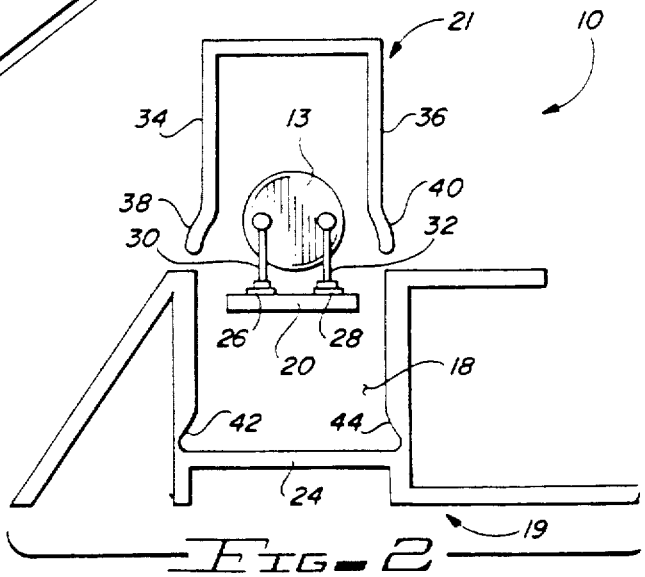
FIG-2
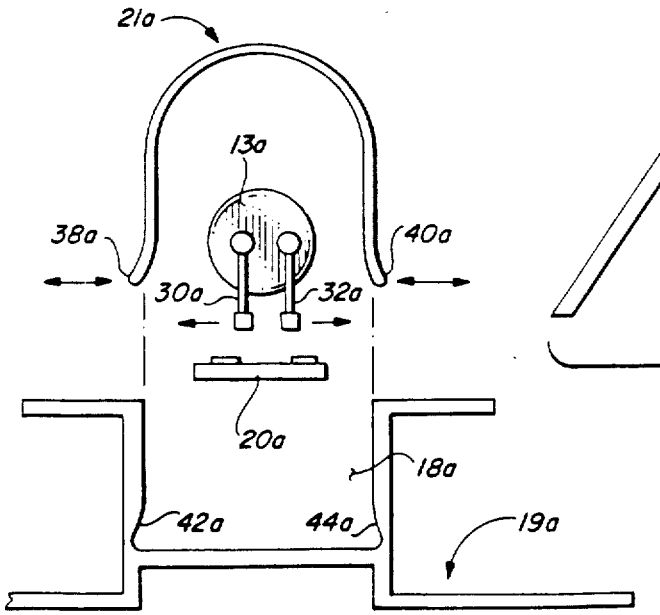
FIG-3
FIG-4
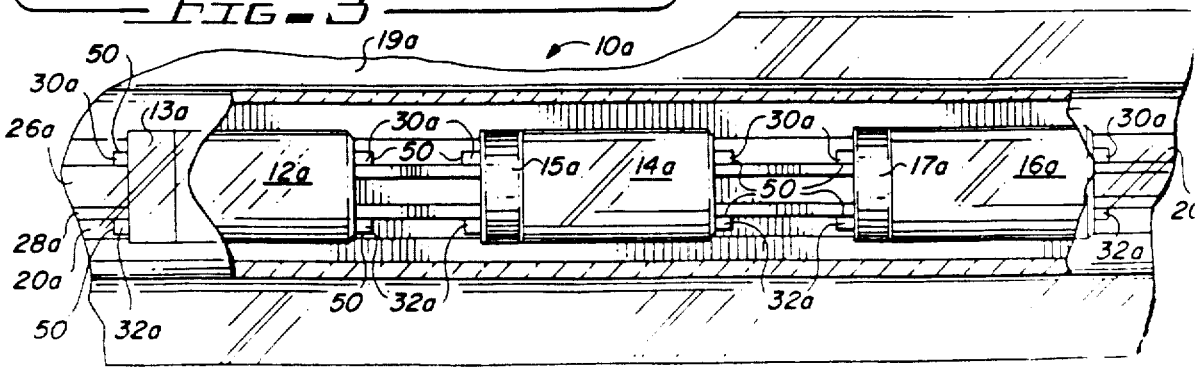

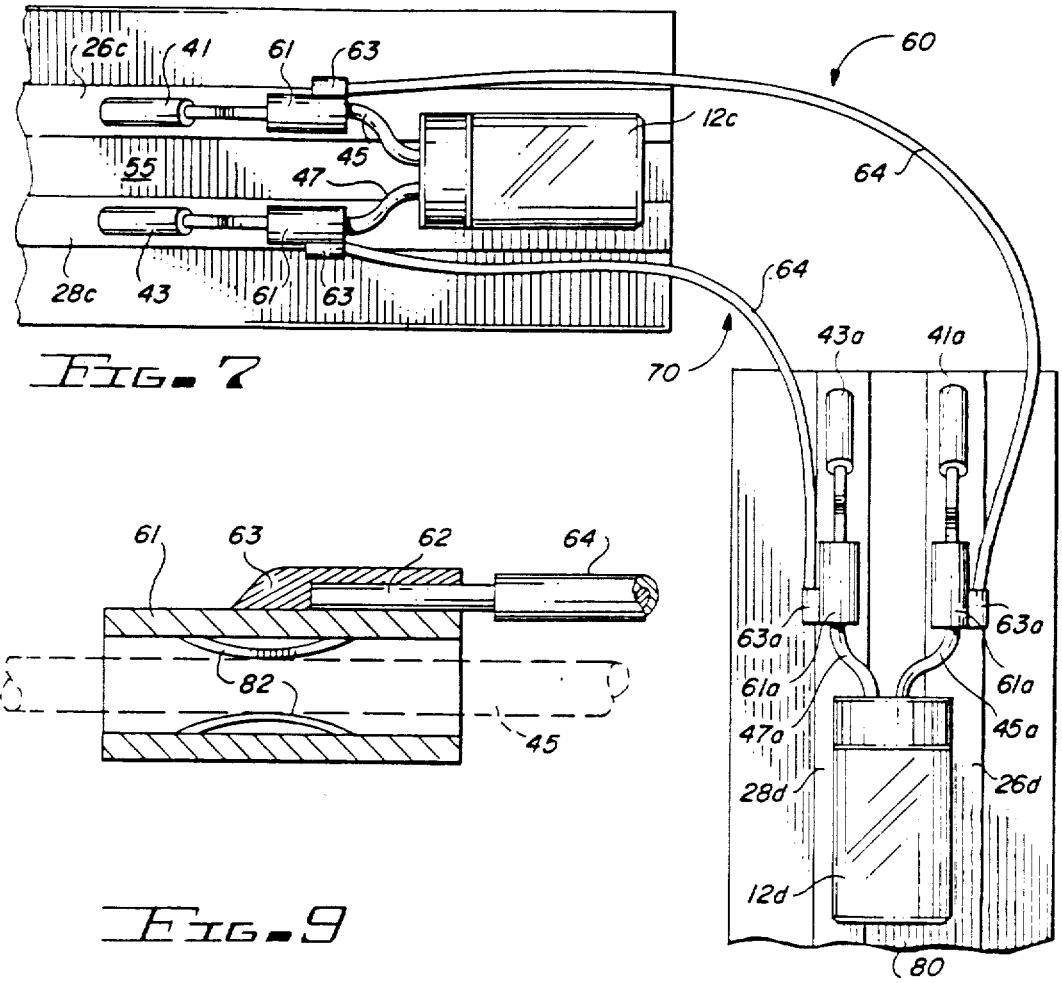
FIG. 7
FIG. 9
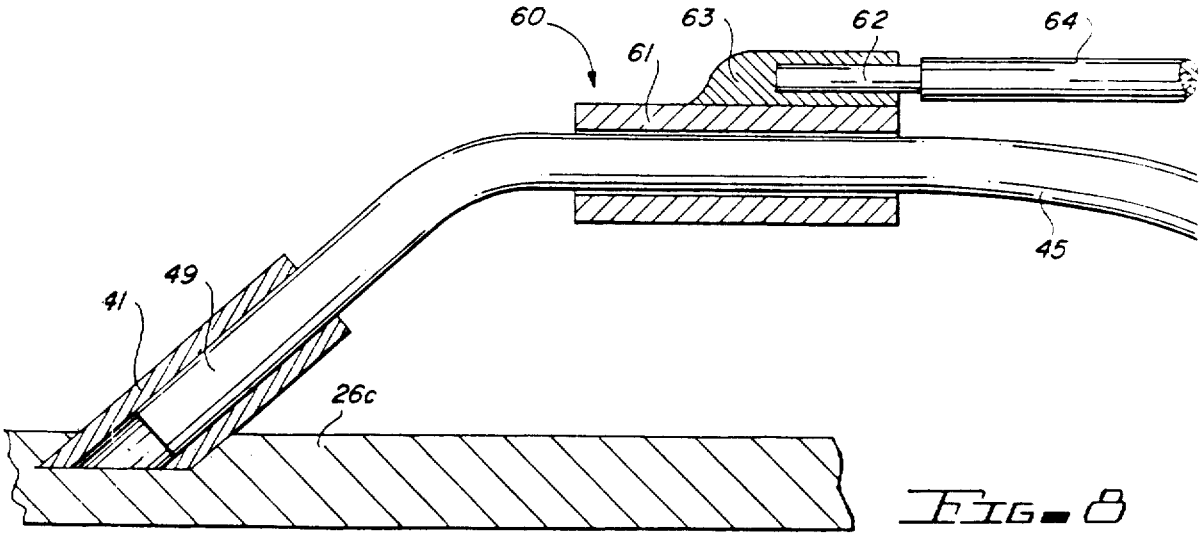
FIG. 8

LOW VOLTAGE LIGHTING SYSTEM REPLACEABLE BULB ASSEMBLY

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention generally relates to lighting systems and, more particularly, to an improved replaceable multiple bulb low voltage assembly for such a system.

2. Prior Art

Strings of light bulbs have been used in the past for various decorative purposes; for example, Christmas tree lighting. Generally, permanent assemblies which utilize multiple decorative light bulbs in dance halls, hotel lobbies, restaurants and the like are difficult to service because the bulbs throw considerable wattage, burn out easily and are arranged in electrical series, so that when one bulb in a series burns out the entire series goes out.

More recently, permanent arrays of low voltage light bulbs with increased service have been used in decorating night clubs, restaurants, discotheques, lounges, exhibits, recreation rooms, exterior displays and the like. Such bulbs are much brighter than L.E.D. displays and thus more decorative. Arrays of low voltage bulbs in elongated housings are now found permanently installed in halls and stairways, chandeliers, along floors and on walls and ceilings. However, those of such arrays which are in electrical parallel instead of electrical series, in order to overcome the previously described problem of entire string burn-out, still do not provide for ready removal and replacement of burned out bulbs. Accordingly, the displays over a period of time gradually lose their decorative appeal.

Accordingly, there remains a need for a long-life decorative, multiple electrical bulb display system which utilizes relatively low voltage bulbs electrically connected in parallel and which permits the easy replacement of individual bulbs as they burn out, so that the optimum decorative effect of the display system is easily maintained.

SUMMARY OF THE INVENTION

The improved low voltage lighting system replaceable bulb assembly of the present invention satisfies all the foregoing needs. The assembly is substantially as set forth in the Abstract above. Thus, it comprises a plurality of low voltage replaceable light bulbs spaced along the length of a non-conductive strip which carries a pair of electrical conductors, all in a housing having a removable transparent cover. The bulbs are releasably electrically connected in parallel to the conductors through spaced electrical contacts. The bulbs are held in the desired position in the housing spaced from the strip by the contacts and/or by flexible brackets secured to the cover and/or housing.

Preferably, the housing, strip and cover can be easily transversely severed between adjacent bulbs to divide the assembly into a plurality of operative units. Thus, the housing and strip can be of aluminum, plastic or the like and the cover is preferably polycarbonate or other suitable impact-resistant plastic. Novel connector assemblies enabling quick connection and disconnection of adjacent units is provided.

Other features of the invention are set forth in the following detailed description and accompanying drawings.

DRAWINGS

FIG. 1 is a schematic perspective view of a first preferred embodiment of the improved low voltage light system bulb assembly of the present invention;

FIG. 2 is a schematic front exploded view of the assembly of FIG. 1;

FIG. 3 is a schematic front exploded view of a second preferred embodiment of the improved low voltage light system bulb assembly of the present invention;

FIG. 4 is a schematic top plan view of the assembly of FIG. 3;

FIG. 7 is a schematic plan view of a fourth preferred embodiment of the invention;

FIG. 8 is a sectional view of the unit electrical connector assembly shown in FIG. 7; and FIG. 9 is a sectional view of an alternate electric connector assembly.

DETAILED DESCRIPTION

FIGS. 1 and 2

Figure 5:
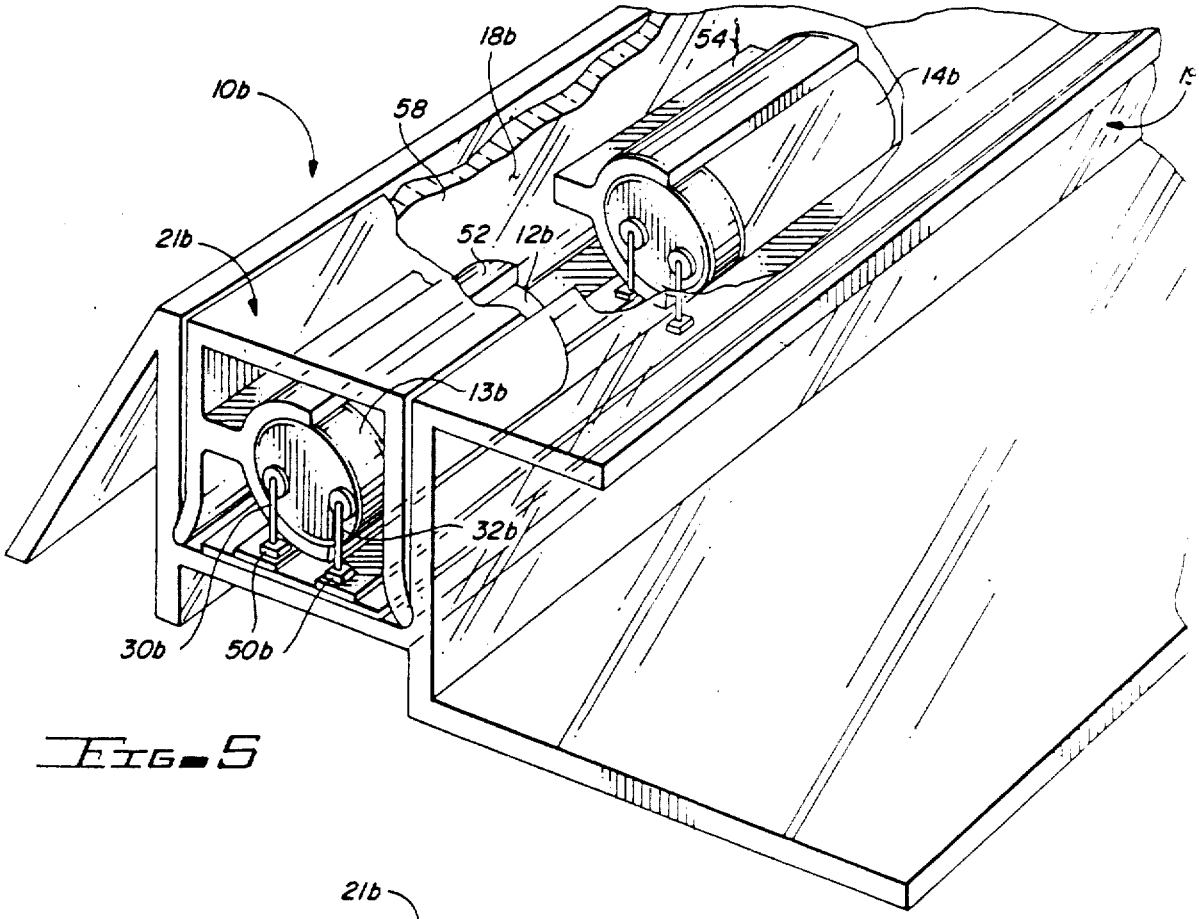
FIG. 5 is a schematic perspective view of a third preferred embodiment of the improved low voltage light system bulb assembly of the present invention.

Now referring more particularly to FIGS. 1 and 2 of the drawings, a first preferred embodiment of the improved low voltage bulb assembly of the present invention is schematically depicted therein. Thus, assembly 10 is shown, which comprises a plurality of low voltage light bulbs 12, 14 and 16 disposed in sockets 13, 15 and 17, respectively, and spaced along the length of a generally rectangular elongated cavity 18 in a housing 19 of plastic, aluminum or the like.

Housing 19 has a transparent rectangular cover 21 releasably secured thereto over cavity 18. Cover 21 preferably is of polycarbonate or other flexible impact-resistant plastic.

An elongated non-conductive strip 20 of, for example, rubber, plastic or the like carries a pair of electrical conductors 26 and 28 which are adapted to be connected by suitable means to a power source (not shown) and housing 19. Ideally, cover 21 is transparent while the inner sides of cavity 18 formed in housing 19 along with the top of strip 20 carries a reflective coating to enhance light emission from the assembly.

Thus, each of bulbs 12, 14 and 16 can easily be replaced when burned out, merely by temporarily removing cover 21, removing the burned out bulb from a socket, inserting a new bulb, and snapping the cover 21 to the position shown in FIG. 1. In this regard, cover 21 has depending sides 34 and 36, the lower ends 38 and 40 of which are contoured to flexibly snap into and out of grooves 42 and 44 in housing 19. Because bulbs 12, 14 and 16 are connected in parallel, a burn out of one such bulb does not affect the operation of any of the other bulbs.

Thus, assembly 10 is simple, inexpensive, decorative and durable. Bulbs 12, 14 and 16 are connected in electrical parallel and can, for example, operate at $<5$ watt with 24 VAC (voltage-alternating current type) for long life. When such bulbs need to be replaced, they can easily be removed from assembly 10 and new bulbs quickly inserted therein, without affecting the continued operation and electrical display of assembly 10 by removal and reconnection of the novel cover.

FIGS. 3 and 4

A second preferred embodiment of the improved low voltage light bulb assembly of the present invention is schematically depicted in FIGS. 3 and 4. Thus, assembly 10a is shown. Components thereof which are similar to those of assembly 10 bear the same numerals but are succeeded by the letter "a". Thus, assembly 10a is substantially identical to assembly 10, including bulbs 12a, 14a and 16a, housing 19a cavity 18a therein and strip 20a.

However, cover 21a is curved and dome-like. Moreover, contacts 30a and 32a are merely straight vertical legs of spring metal with lower square feet 50 disposed at opposite ends of each of the bulbs. Only one pair of contacts per bulb need be operative electrically. Contacts 30a and 32a spring apart to releasably snap grip the outer surfaces of conductor 26a and 28a so as to tightly but releasably hold bulbs 12a, 14a and 16a in place above conductors 26a and 28a and in electrical contact therewith. Removal or burn-out of any bulb does not affect operation of the remaining bulbs. Moreover, assembly 10a can be transversely severed between adjacent bulbs to form two or more functional units. Likewise, a series of units 10a can be connected in tandem, electrically and mechanically to provide an elongated light assembly.

Figure 6:
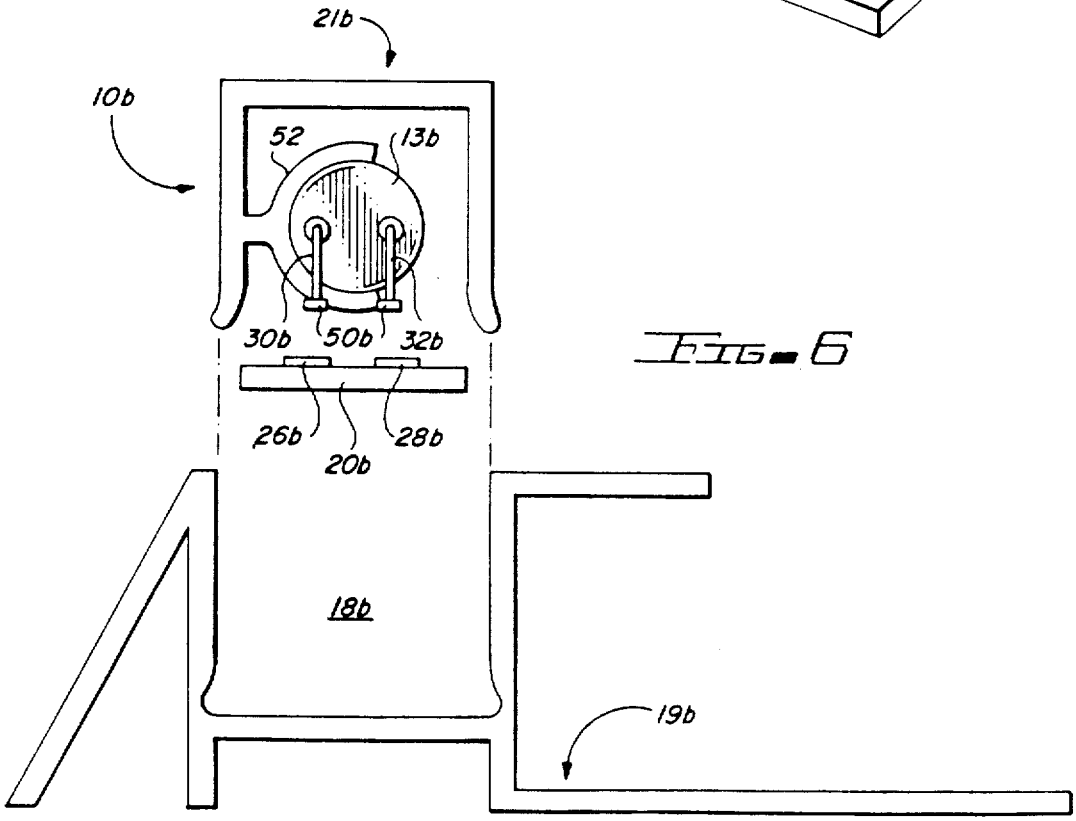
FIG. 6 is a schematic front exploded view of the assembly of FIG. 5.

FIGS. 5 and 6

A third preferred embodiment of the improved low voltage light display bulb assembly of the present invention is schematically depicted in FIGS. 5 and 6. Thus, assembly 10b is shown. Components thereof similar to those of assembly 10 bear the same numerals, but are succeeded by the letter "b". Assembly 10b is identical to assembly 10 except that bulbs 12b, 14b and 16b are releasably held in flexible transparent side brackets 52, 54 and 56 of plastic or the like. Brackets 52, 54 and 56 are connected to the sidewall 58 of cover 21b. Moreover, contacts 30 and 32 are identical to straight depending leg contacts 30a and 32a, but bear square lower feet 50b. Brackets 52, 54 and 56 releasably hold the respective bulbs in place, and feet 50b are adapted to abut conductors 26b and 28b. If desired, contacts 30b and 32b can be designed to flex and provide a positive bias to conductors 26b and 28b. Assembly 10b has the advantages of assemblies 10 and 10a.

FIGS. 7 and 8

A fourth preferred embodiment of the improved low voltage light display assembly of the present invention is schematically depicted in FIGS. 7 and 8. Components similar to those of assembly 10 bear the same numerals, but are succeeded by the letter "c". The assembly shown in FIG. 7 is similar to assembly 10 except that the bulb 12c is connected to conductors 26c and 28d in an alternate manner, as is more clearly shown in FIG. 8. Units 50 and 80 are likewise interconnected electrically by a unique connector also as more clearly shown in FIG. 8.

The components on unit 60 are similar to the components on unit 50 and bear the same numerals, but are succeeded by the letter "a".

Referring to FIGS. 7 and 8, female receptors 41 and 43 are soldered to or otherwise appropriately electrically and mechanically connected to conductors 26c and 28c. Bulb 12c has two electrical leads 45 and 47 depending thereof, with the ends 49 and 51 respectively being inserted into receptors 41 and 43.

Novel connector assemblies 60 and 70 include a tubular member 61 having one end 62 of conductor 64 soldered to the outside thereof by solder tab 63. Prior to inserting end 49 into receptor 41, tubular member 61 is slipped over end 49 of 45, making electrical contact therewith. Prior to insertion of end (not shown) of lead 45a on unit 60 into receptor 41a, tubular member 61a is slipped over such end, making electrical contact therewith. In this manner, connector assemblies 60 and 70 provide electrical connection between units 50 and 80.

FIG. 9

This figure discloses an embodiment of a variation of the connector assembly 60 shown in FIG. 8. More particularly, the inside of tubular member 61 has been provided with a plurality of inwardly directed contacts 82 so as to provide a more positive electrical connection between lead 45 and member 61. Contacts 82 are preferably metal spring members appropriately secured to the inside of member 61, which are depressed against the inside surface of member 61 when lead 46 is inserted therethrough.

Various other modifications, changes, alterations and additions can be made in the improved low voltage light bulb assembly of the present invention, its components and their parameters. All such modifications, changes, alterations and additions as are within the scope of the appended claims form part of the present invention.

What is claimed is:

1. An improved low voltage lighting system replaceable bulb assembly, said assembly comprising, in combination:

(a) a plurality of replaceable low voltage light bulbs;
(b) an elongated reflective non-conductive strip carrying a plurality of electrical conductors;
(c) a plurality of spaced electrical contacts releasably connecting said bulbs spaced along the length of said strip in parallel to said strip;
(d) an elongated housing retaining said strip and said bulbs; and,
(e) a removable transparent cover over said housing providing access to said bulbs for replacement thereof,
(f) wherein each of said bulbs has a plurality of said spaced electrical contacts secured thereto for releasable contact with said conductors.

2. The improved low voltage lighting system bulb assembly of claim 1 wherein said electrical contacts are springs which releasably hold said bulbs in electrical contact with said conductors by spring tension.

3. The improved low voltage lighting system bulb assembly of claim 1 wherein said strip, housing and cover are severable transversely at any point between adjacent ones of said bulbs to shorten said assembly.

4. The improved low voltage lighting system bulb assembly of claim 1 wherein said housing is made of aluminum, wherein said strip is made of an insulative material and wherein said cover comprises polycarbonate plastic.

5. The improved low voltage lighting system bulb assembly of claim 4 wherein said bulbs are $<5$ watt bulbs utilizing 24 VAC.

6. The improved lighting system bulb assembly of claim 5 wherein a plurality of said assemblies are electrically and mechanically interconnected.

[7. An improved lighting system assembly comprising:

(a) a plurality of electrically interconnected units, (b) each of said units having, (1) a plurality of replaceable low voltage light bulbs, (2) a plurality of electrical conductors, (3) receptor means secured to said conductors, and adapted to be electrically and releasably connected to said light bulbs, and (c) interconnection means disposed between each of said units to electrically and releasably interconnect the conductors on at least two of said units.]

*8. An improved low voltage lighting system comprising:*

*(a) an elongated housing including a generally rectangular elongated cavity having a floor;*

*(b) an elongated non-conductive strip having a lower surface;*

*(c) a plurality of conductors secured to said non-conductive strip;*

*(d) a plurality of replaceable low voltage light bulbs selectively connectable to said conductors;*

*(e) electrical contact means for connecting said light bulbs to said conductors and secured to said conductors such that said lower surface of said non-conductive strip is everywhere non-conductive; and*

*(f) a removable transparent cover over said housing retaining said non-conductive strip within said cavity with said lower surface of said non-conductive strip abutting said floor of said-cavity.*

*9. The improved low voltage lighting system of claim 8 wherein said electrical contact means comprises a plurality of sockets and each of said light bulbs includes a plurality of electrical contacts insertable within said sockets.*

*10. An improved low voltage lighting system replaceable bulb assembly, said assembly comprising, in combination:*

*(a) a plurality of replaceable low voltage light bulbs;*

*(b) an elongated non-conductive strip having a lower surface;*

*(c) a plurality of electrical conductors secured to said non-conductive strip;*

*(d) an elongated housing including a generally rectangular elongated cavity having a floor;*

*(e) a plurality of sockets for receiving said bulbs spaced along the length of said conductors and secured thereto such that said lower surface of said non-conductive strip is not penetrated;*

*(f) a removable transparent cover insertable within said cavity such that said non-conductive strip is retained with said lower surface thereof abutting said floor of said cavity.*

* * * * *